United States Patent
Hayama et al.

(10) Patent No.: US 6,332,844 B1
(45) Date of Patent: Dec. 25, 2001

(54) PROPELLER SHAFT AND CONSTANT VELOCITY UNIVERSAL JOINT FOR A PROPELLER SHAFT

(75) Inventors: Yoshihiko Hayama; Haruo Nagatani, both of Shizuoka-ken (JP)

(73) Assignee: NTN Corporation, Osaka-fu (JP)

( * ) Notice: Subject to any disclaimer, the term of this patent is extended or adjusted under 35 U.S.C. 154(b) by 0 days.

(21) Appl. No.: 09/474,101

(22) Filed: Dec. 29, 1999

(30) Foreign Application Priority Data

Feb. 23, 1999 (JP) .................................................. 11-045169

(51) Int. Cl.$^7$ ...................................................... F16D 3/224
(52) U.S. Cl. ............................................... 464/145; 464/906
(58) Field of Search ............................... 464/145, 906; 403/359.1

(56) References Cited

U.S. PATENT DOCUMENTS

| | | | |
|---|---|---|---|
| 1,665,280 | * | 4/1928 | Rzeppa ................................. 464/145 |
| 4,437,331 | * | 3/1984 | Dore .................................... 464/145 |

FOREIGN PATENT DOCUMENTS

0802341A1   10/1997  (EP) .

OTHER PUBLICATIONS

Machinery's Handbook, 25th ed. New York International Press, 1996. p. 2056. TJ151.M3 1996.*

* cited by examiner

Primary Examiner—Lynne H. Browne
Assistant Examiner—Greg Binda
(74) Attorney, Agent, or Firm—Arent Fox Kintner Plotkin & Kahn, PLLC

(57) ABSTRACT

The width (L) in the circumferential direction of the outer surface $2a$ of an inner joint member 2 is $L \geq 3.5$ mm. When the assembly angle ($\theta_0$) of the torque transmitting ball 3 is set to 50°, the width (W) in the axial direction is set so that the ratio Rw ($=W/PCD_{SERR}$) between the width (W) in the axial direction and the pitch circle diameter ($PCD_{SERR}$) of the teeth of an engagement portion $2c$ lies within the range of $0.57 < Rw \leq 0.95$. Thus, while enabling the assembly of the torque transmitting ball at the assembly angle $\theta_0=50°$, cold forging on the inner joint member 2 is made possible, thereby reducing the processing cost. By reducing the width (W) in the axial direction as much as possible, the weight, dimension, and material cost can be reduced.

6 Claims, 5 Drawing Sheets

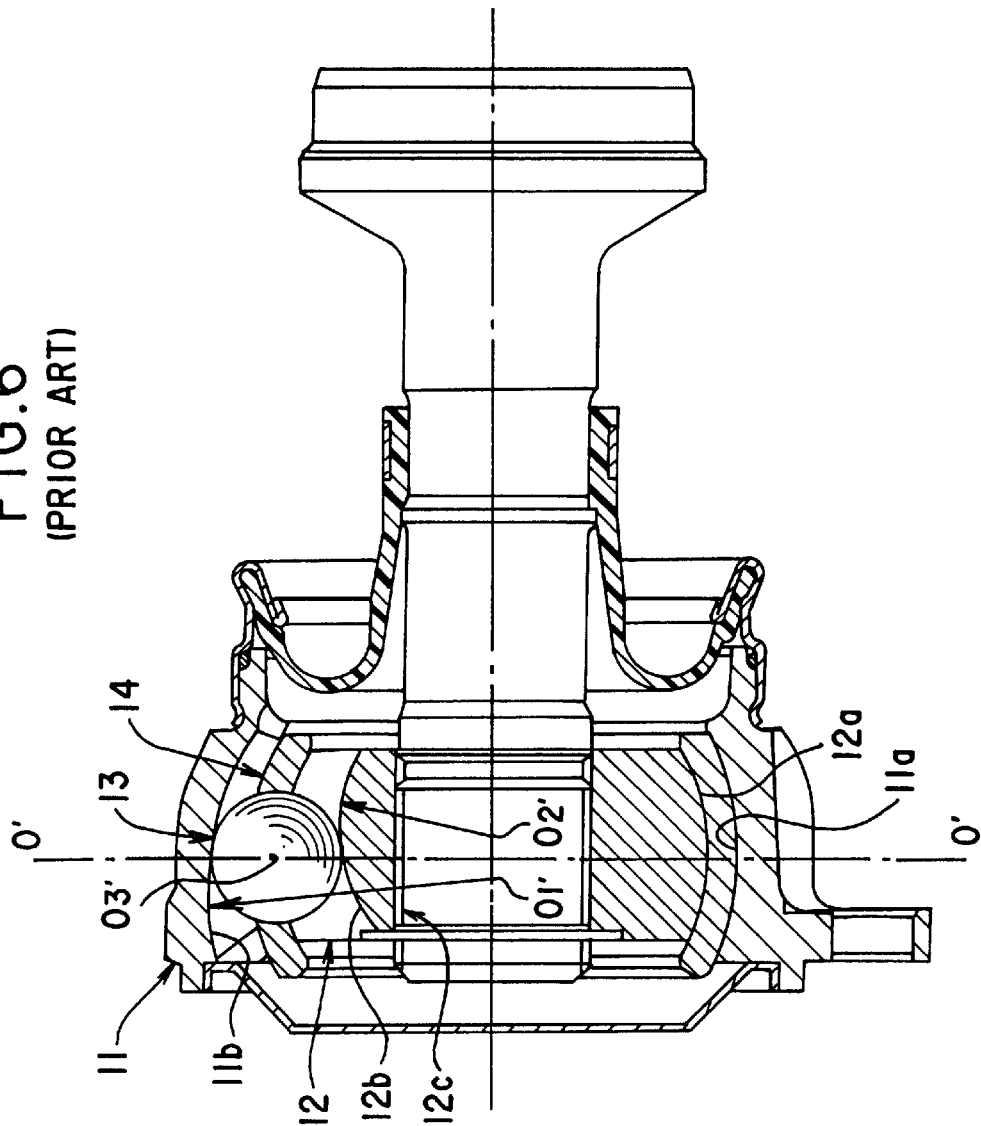

PROPELLER SHAFT AND CONSTANT VELOCITY UNIVERSAL JOINT FOR A PROPELLER SHAFT

BACKGROUND OF THE INVENTION

The present invention relates to a propeller shaft for transmitting rotational power from the transmission to the differential in a four-wheel drive vehicle (4WD vehicle), front engine rear drive vehicle (FR vehicle), or the like. Although a propeller shaft of two-joint type is typical, a propeller shaft of three-joint type, four-joint type, or the like is also used according to the structure of the vehicle and the required characteristics.

At present, except for some luxury vehicles, it is the mainstream to use a Cardan joint (joint using a spider) for the propeller shaft of a four-wheel drive vehicle (4WD vehicle) or front engine rear drive vehicle (FR vehicle). Due to the non-constant velocity of the Cardan joint, however, the noise, vibration and harshness commonly known as NVH characteristics of the vehicle deteriorate. As means for improving the NVH characteristics, there is a tendency to use a constant velocity universal joint for the propeller shaft.

FIG. 6 shows a Rzeppa constant velocity universal joint (ball fixed constant velocity universal joint) used for a conventional propeller shaft. The constant velocity universal joint comprises: an outer joint member 11 in which six curved guide grooves 11b are formed in the axial direction on an spherical inner surface 11a; an inner joint member 12 in which six curved guide grooves 12b are formed in the axial direction on an spherical outer surface 12a and an engagement portion 12c having teeth (serration or spline) is formed on an inner surface; six torque transmitting balls 13 disposed in six ball tracks formed by the cooperation between the guide grooves 11b of the outer joint member 11 and the corresponding guide grooves 12b of the inner joint member 12, respectively; and a cage 14 for holding the torque transmitting balls 13.

The center O1' of the guide groove 11b of the outer joint member 11 is offset from the spherical center of the inner surface 11a, and the center O2' of the guide groove 12b of the inner joint member 12 is offset from the spherical center of the outer surface 12a, by an equal distance in the opposite axial directions (the center O1' is offset to the left side in the diagram and the center O2' is offset to the right side in the diagram). The ball tracks formed by the cooperation between the guide grooves 11b and the corresponding guide grooves 12b have therefore the shapes such that the ball tracks are widened toward one side in the axial direction (left side in the diagram) like wedge shapes. Both of the spherical center of the inner surface 11a of the outer joint member 11 and the spherical center of the outer surface 12a of the inner joint member 12 lie within the joint center plane O' including the center O3' of the torque transmitting ball 13.

When the outer joint member 11 and the inner joint member 12 is displaced with each other by an angle θ, the torque transmitting balls 13 guided by the cage 14 are maintained in the two-equally divided plane (θ/2) of the angle θ at any operating angle θ, so that the constant velocity of the joint is assured.

A constant velocity universal joint has been often used for a drive shaft in the power transmitting mechanism of a vehicle. The conventional constant velocity universal joint for a propeller shaft is adopted the very design of the conventional constant velocity universal joint for a drive shaft. However, when the characteristics of the power transmission of the joint for the propeller shaft are compared with those of the joint for the drive shaft, the torque loaded on the propeller shaft is about the half of that loaded on the drive shaft and the practical range of the operating angle of the propeller shaft is narrower than that of the drive shaft. Consequently, the conventional specification adopting the design for the drive shaft as it is more than the required characteristics. It has room for improvement from the viewpoint of further reduction of the weight, size, and cost. Since the propeller shaft rotates higher than the drive shaft, it is preferable that the joint part is more compact also from the viewpoint of increase in the rotational speed.

SUMMARY OF THE INVENTION

It is therefore an object of the invention to provide a constant velocity universal joint for a propeller shaft, which is lighter, more compact, and cheaper.

In order to solve the problems, the invention provides a structure comprising: an outer joint member in which eight guide grooves extending in the axial direction are formed on an inner spherical surface thereof, an inner joint member in which eight guide grooves extending in the axial direction are formed on an outer spherical surface thereof and an engagement portion having teeth which come into tooth-engagement with a shaft portion of the propeller shaft is formed on an inner surface thereof; eight torque transmitting balls disposed in eight ball tracks, respectively, each formed by cooperation between the guide groove in the outer joint member and the corresponding guide groove in the inner joint member; and a cage for holding the torque transmitting balls, wherein the ball tracks are widened toward one side in the axial direction like wedge shapes, and the ratio Rw (=W/PCD$_{SERR}$) between the width (W) in the axial direction of the inner joint member and the pitch circle diameter (PCD$_{SERR}$) of the teeth of the engagement portion is 0.57<Rw≦0.95.

In this case, the "width (W) in the axial direction of the inner joint member" uses the dimension in the axial direction of the guide grooves in the inner joint member as a reference.

0.57<Rw≦0.95 is set for the following reason.

First, when each of the number of ball tracks and the number of the torque transmitting balls arranged is set to eight, the width in the circumferential direction of the outer surface of the inner joint member (L: dimension in the circumferential direction of the outer surface between the guide grooves) is relatively smaller than that in the conventional joint (ball fixed constant velocity universal joint using six balls) shown in FIG. 6. This tendency becomes more conspicuous as the outer diameter of the inner joint member is reduced in order to make the joint more compact. On the other hand, in the case of forming the inner joint member by cold forging in order to improve quantity production, when the width (L) in the circumferential direction of the outer surface is too small, the material cannot sufficiently move in a forming die. Consequently, the guide grooves and the outer surface are not finished accurately and the life of the die is also shortened. As a result of experiments, it is confirmed that the minimum value of the width (L) in the circumferential direction of the outer surface at which preferable forming accuracy and life of the die can be obtained is 3.5 mm. In order to realize the cold forging to the inner joint member, it is necessary to assure 3.5 mm or larger as the width (L) in the circumferential direction (L≧3.5 mm).

The width (L) in the circumferential direction of the outer surface is not uniform in the axial direction. It drastically decreases from the center part in the axial direction to both ends and becomes the minimum value at the both ends. From the geometry shown in FIG. 4, the coordinates of the border part (shoulder part) between the outer surface 2a and the guide groove 2b of the inner joint member 2 can be obtained by solving the following two equations (the chamber in the shoulder part and the end face is not considered).
Equation of the guide groove surface:

$$(X+e_x)^2+\{(Y^2+Z^2)^{1/2}-(PCR+e_y)\}^2=(\alpha R)^2$$

Equation of the outer surface:

$$X^2+Y^2+(Z-f)^2=R$$

where,

X, Y, Z: coordinates

PCR: length of a line connecting the center O2 of the guide groove 2b and the center O3 of the torque transmitting ball 3

$e_x$: offset amount of the circular center of the guide groove 2b from the PCD center $e_y$: offset amount of the circular center of the guide groove 2b from the PCD center α: contact ratio f: offset amount of the center O2 of the guide groove 2b R: radius of the torque transmitting ball 3

The width (L) in the circumferential direction of the outer surface is obtained from the two equations and the width ($W_1$) in the axial direction of the inner joint member satisfying the condition of L=3.5 mm at both ends is obtained. As described above, L≧3.5 mm is necessary in order to enable the inner joint member to be cold forged. Consequently, the width (W) in the axial direction has to satisfy the condition of W≦$W_1$.

In order to determine the width (W) in the anal direction of the inner joint member, it is necessary to consider the axial movement range of the torque transmitting balls in the guide grooves at the time of angular displacement. That is, it is desirable to reduce the width (W) in the axial direction of the inner joint member as much as possible within the range in which W≦$W_1$ is satisfied. When the width (W) in the axial direction is reduced more than necessary, a case such that the torque transmitting ball comes out of the guide groove in the inner joint member when the outer joint member and the inner joint member are angular displaced may occur. It is therefore necessary to set the width (W) in the axial direction of the inner joint member to a size in which the torque transmitting balls do not come out of the guide grooves by using the positions of the torque transmitting balls when the outer and inner joint members are angular displaced at the largest angle as a reference.

The displacement angle between the outer and inner joint members in the constant velocity universal joint of this kind becomes the largest when the torque transmitting balls are assembled. To be specific, as shown in FIG. 5, in the constant velocity universal joint of this kind, after mounting an assembly of the inner joint member 2 and the cage 4 onto the inner surface of the outer joint member 1, the inner joint member 2 is angular displaced relative to the outer joint member 1 by a predetermined angle $\theta_0$ (the displacement angle $\theta_0$ at this time is called "assembly angle $\theta_0$"). The pocket of the cage 4 is pulled to the outside of the joint and, in such a state, the torque transmitting ball 3 is assembled in the pocket of the cage 4. At this time, when the torque transmitting ball comes out from the guide groove, the assembly cannot be made. Consequently, the limit value ($W_0$) of the width (W) in the axial direction of the inner joint member within which the torque transmitting ball does not come out when assembling is obtained and the width (W) in the axial direction is set so as to satisfy the condition of W≧$W_0$. The assembly angle ($\theta_0$) is larger than the "maximum operating angle" as the maximum functionally permitted displacement angle of the joint and the practical operating angle range is usually set within the range smaller than the maximum operating angle.

From the above, the optimum range of the width (W) in the axial direction of the inner joint member is obtained as $W_0$≦W≦$W_1$. Since the values of ($W_0$) and ($W_1$) vary according to the joint size, in order to obtain a more general reference, it is necessary to establish the relation between the optimum range of the width (W) and the basic dimension related to the joint size. ($W_0$) varies also according to the assembly angle ($\theta_0$) of the torque transmitting ball. Consequently, the assembly angle ($\theta_0$) is set to 50°, ($W_0$) and ($W_1$) are obtained for each of various joint sizes, and the ratio Rw (=W/$PCD_{SERR}$) between (W) and the pitch circle diameter ($PCD_{SERR}$) of the teeth of the engagement portion is obtained. As a result, the condition of 0.57<Rw≦0.95 is obtained and it was found that the condition is the reference showing the optimum range of the width (W) in the axial direction of the inner joint member. When Rw≦0.57, the torque transmitting ball at the assembly angle $\theta_0$=50° cannot be performed. On the other hand, when Rw>0.95, it is difficult to perform cold forging to the inner joint member and it is necessary to fundamentally review the processing method. Even when another processing method is adopted, the processing cost cannot help but increase. Increase in the width (W) in the axial direction is disadvantageous in terms of weight, dimension, and material cost. From the viewpoint of reducing the weight, size, and cost of the joint and not hindering the assembly of the joint, 0.57<Rw≦0.95 is the optimum range of the width (W) in the axial direction of the inner joint member.

When the static torsional strength of the inner joint member produced as a prototype on the basis of the reference was measured, it was confirmed that the static torsional strength of the inner joint member is higher than that of the coupling part (usually, a stub shaft is used) of the shaft and there is no problem with respect to the strength as the joint for a propeller shaft.

The assembly angle ($\theta_0$) of the torque transmitting ball is set to 50° in the above for the following reason. Specifically, in the constant velocity universal joint of this kind, when the outer and inner joint members are angular displaced relative to each other by the angle $\theta_0$ and the torque transmitting ball is assembled in a predetermined pocket of the cage, in association with the phase change in the rotational direction, the torque transmitting balls already assembled in another pockets move in the circumferential and radial directions with respect to the pockets in the cage (as the angle $\theta_0$ increases, the movement amount of the torque transmitting balls increase). It is necessary to set the dimension in the circumferential direction of the pockets in the cage so as not to cause interference with the torque transmitting balls by considering the movement amount in the circumferential direction of the torque transmitting balls. Consequently, when the assembly angle ($\theta_0$) is too large, the dimension in the circumferential direction of the column parts between the pockets become too small (since it is necessary to increase the dimension in the circumferential direction of the pockets), so that it is feared that the strength of the cage is not sufficient. Especially, when the number of the torque transmitting balls arranged is eight, the number of pockets is larger than that of the conventional joint. It is therefore important to assure the strength of the cage. On the other hand, when the assembly angle ($\theta_0$) is too small, the assembly itself of the torque transmitting balls cannot be made. It is therefore preferable to set the assembly angle ($\theta_0$) as small as possible within the range in which the torque transmitting balls can be assembled while assuring the strength of the cage. As a result of the analysis and experiments from the point of view, it was found that a preferable result can be obtained when the assembly angle ($\theta_0$) is set to 50°.

The ratio $r1 (=PCD_{BALL}/D_{BALL})$ between the pitch circle diameter ($PCD_{BALL}$) of the torque transmitting ball and the diameter ($D_{BALL}$) can be set to a value in the range of $3.3 \leq r1 \leq 5.0$. The range of $3.3 \leq r1 \leq 5.0$ is determined to assure the strength of the outer joint member and the like and the load carrying capacity and durability of the joint so as to be equal to or more than those of the conventional joint (ball fixed constant velocity universal joint using six balls). That is, in the constant velocity universal joint, it is difficult to largely change the pitch circle diameter ($PCD_{BALL}$) of the torque transmitting ball within the range of the limited space. Consequently, the value of r1 mainly depends on the diameter ($D_{BALL}$) of the torque transmitting ball. When $r1<3.3$ (mainly the case where the diameter $D_{BALL}$ is large), the other members (such as the outer joint member, inner joint member, and the like) become too thin and a concern regarding the strength occurs. On the contrary, when $r1>5.0$ (mainly the case where the diameter $D_{BALL}$ is small), the load carrying capacity becomes small and a concern regarding the durability occurs. The surface pressure of the contact part of the torque transmitting ball and the guide groove increases (because the contact oval of the contact part becomes small when the diameter $D_{BALL}$ is reduced) and it is feared that it causes a notch in the edge part of the shoulder of the groove, or the like.

By setting $3.3 \leq r1 \leq 5.0$, the strength of the outer joint member and the like, and the load carrying capacity and durability of the joint which are equal to or more than those of the conventional joint can be assured. It is more preferable to set the value within the range of $3.5 \leq r1 \leq 5.0$.

The ratio r2 between the outer diameter ($D_{OUTER}$) of the outer joint member and the pitch circle diameter ($PCD_{SERR}$) of the teeth of the engagement portion of the inner joint member can be set to a value within the range of $2.5 \leq r2 < 3.2$. The reason of setting $2.5 \leq r2 < 3.2$ is as follows. The pitch circle diameter ($PCD_{SERR}$) of the teeth of the engagement portion of the inner joint member cannot be largely changed in relation to the strength of the shaft and the like. The value of r2 therefore depends on mainly the outer diameter ($D_{OUTER}$) of the outer joint member. In the case of $r2<2.5$ (mainly, when the outer diameter $D_{OUTER}$ is small), each of the parts (outer joint member, inner joint member, and the like) becomes too thin and a concern occurs from the viewpoint of strength. On the other hand, when $r2 \geq 3.2$ (mainly the case where the outer diameter $D_{OUTER}$ is large), the object of reducing the size cannot be achieved. By setting $2.5 \leq r2 < 3.2$, the outer diameter can be reduced while assuring the strength of the outer joint member and the like and the durability of the joint so as to be equal to or more than those of the conventional joint. In the conventional joint (fixed constant velocity universal joint using six balls), generally, $r2 \geq 3.2$.

The present Invention has effects shown below.

(1) By setting the width (W) in the axial direction of the inner joint member to a value within the range of $0.57<Rw \leq 0.95$, the cold forging to the inner joint member is made possible and the processing cost can be reduced. By reducing the axial width of the inner joint member more than the conventional joint, the weight, size, and material cost are reduced.

(2) By setting the width (L) in the circumferential direction of the outer surface of the inner joint member equal to or larger than 3.5 mm ($L \geq 3.5$ mm), the cold forging to the inner joint member is made possible and preferable forming accuracy can be obtained.

(3) By setting the assembly angle ($\theta_0$) of the torque transmitting ball to 50°, while assuring the strength of the cage, the torque transmitting ball can be assembled.

(4) By setting the ratio r1 ($=PCD_{BALL}/D_{BALL}$) to $3.3 \leq r1 \leq 5.0$ and setting the ratio r2 to $2.5 \leq r2 < 3.2$, while assuring the strength, load carrying capacity, and durability equal to or more than those of the conventional joint, the outer diameter ($D_{OUTER}$) can be further reduced.

(5) Since the joint part is light and compact, the propeller shaft of the invention has excellent high-speed rotatability.

BRIEF DESCRIPTION OF THE DRAWINGS

FIG. 6 Is a vertical cross sectional view showing a constant velocity universal joint for a conventional propeller shaft.

DESCRIPTION OF THE PREFERRED EMBODIMENTS

An embodiment of the invention will be described hereinbelow with reference to the drawings.

Figure 1:
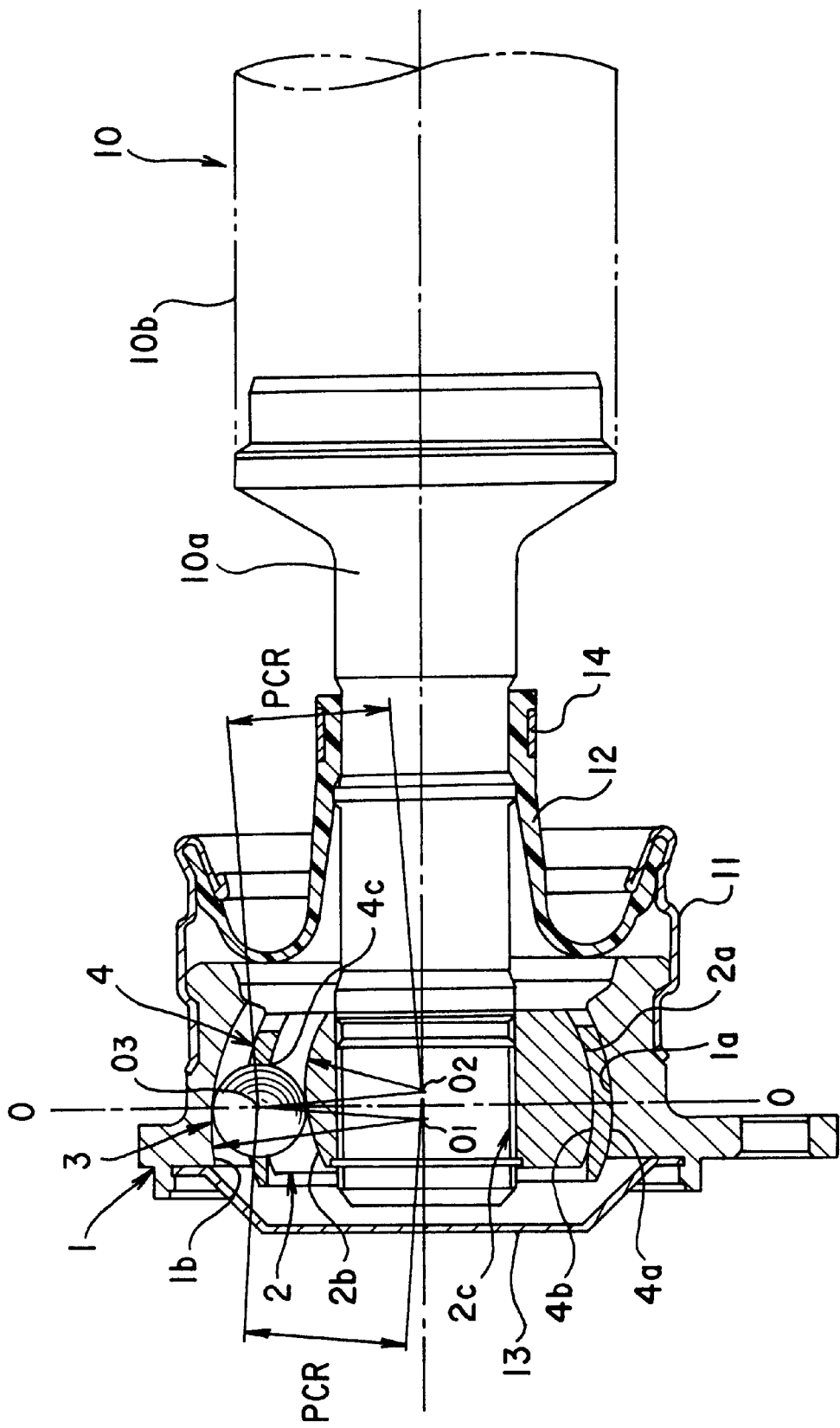
FIG. 1 Is a vertical cross sectional view (cross section taken along line O-A in FIG. 2) of a constant velocity universal joint according to an embodiment of the invention.
Figure 2:
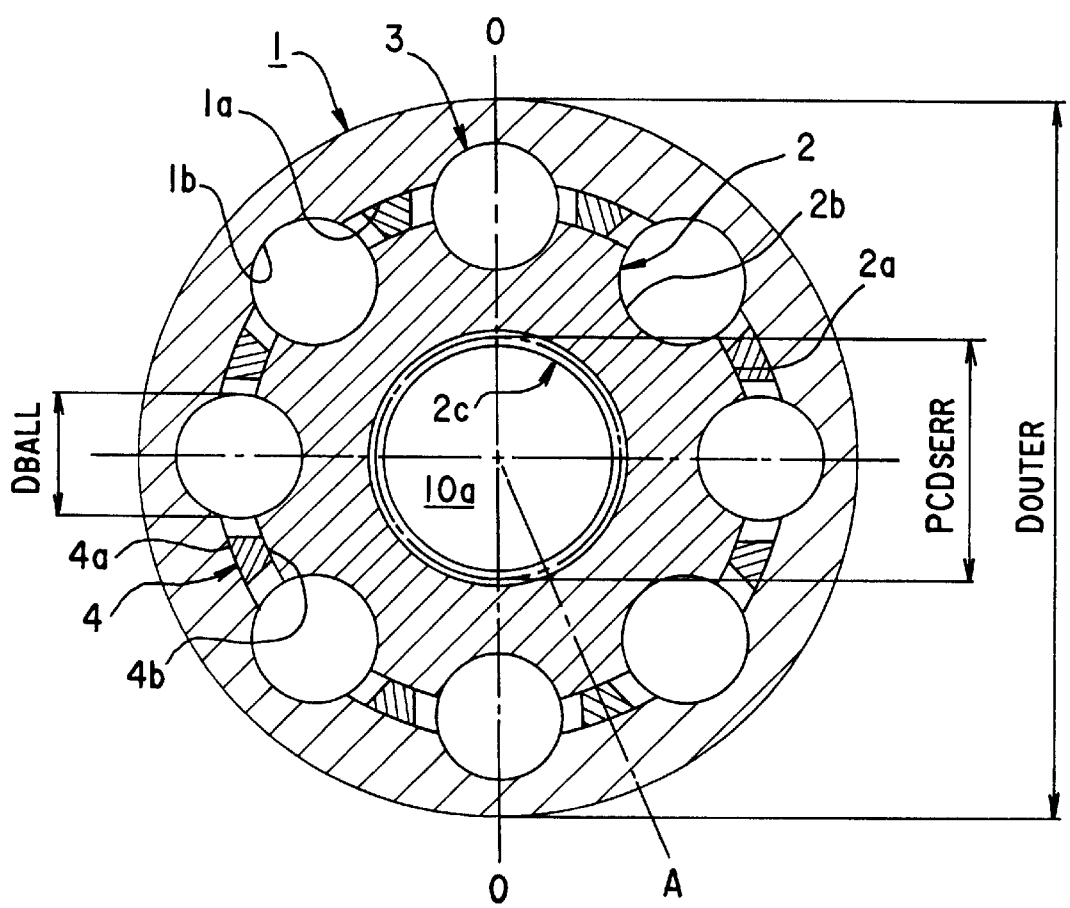
FIG. 2 is a transverse cross sectional view (cross section taken along line O—O in FIG. 1) of the constant velocity universal joint according to the embodiment of the invention.

FIGS. 1 and 2 show a fixed constant velocity universal joint attached to a shaft portion 10 of a propeller shaft. The shaft protion 10 of the propeller shaft comprises a stub shaft 10a and an intermediate shaft 10b coupled to the stub shaft 10a. Usually, the stub shaft 10a is a solid shaft made of steel and the intermediate shaft 10b is a hollow shaft made of steel, fiber reinforced plastic (FRP) or the like.

The constant velocity universal joint of the embodiment comprises: an outer joint member 1 in which eight curved guide grooves 1b are formed in the axial direction on an spherical inner surface 1a; an inner joint member 2 in which eight curved guide grooves 2b are formed in the axial direction on an spherical outer surface 2a and an engagement portion 2c having teeth (serration or spline) is formed in an inner surface; eight torque transmitting balls 3 disposed in eight ball tracks formed by the cooperation of the guide grooves 1b of the outer joint member 1 and the corresponding guide grooves 2b of the inner joint member 2; and a cage 4 for holding the torque transmitting balls 3. As shown by way of example in FIG. 1, the torque transmitting ball 3 is retained within a pocket 4c formed in the cage 4.

The axial end part of the stub shaft 10a is engaged (serration engaged or spline engaged) with the teeth of the engagement portion 2c of the inner joint member 2. A boot 12 is attached to one end side of the outer joint member 1 via a boots adaptor 11 and a seal plate 13 is attached to the other end side. The boot 12 is fixed to the periphery of the stub shaft 10a by a boot band 14. The inside of the joint is sealed by the boot 12 and the seal plate 13. The outer joint member 1 is coupled to the gear shaft of the transmission or the differential of a vehicle. In a propeller shaft of 3-joint type or 4-joint type, there is a case that the outer joint member 1 is coupled to the another intermediate shaft.

In the embodiment, the center O1 of the guide groove 1b of the outer joint member 1 is offset with respect to the spherical center of the inner surface 1a and the center O2 of the guide groove 2b of the inner joint member 2 is offset from the spherical center of the outer surface 2a, respectively, in the opposite directions (the center O1 is offset to the left side in the diagram and the center O2 is offset to the right side in the diagram) by an equal distance. Consequently, the ball tracks formed by the cooperation between the guide grooves 1b and the corresponding guide grooves 2b have wedge shapes widened toward one side (left side in the diagram) in the axial direction.

Both of the spherical center of the outer surface 4a of the cage 4 and the spherical center of the inner surface 1a of the outer joint member 1 serving as a guide surface of the outer surface 4a of the case 4 are within the joint center plane O including the center O3 of the torque transmitting ball 3. Both of the spherical center of the inner surface 4b of the cage 4 and the spherical center of the outer surface 2a of the inner joint member 2 serving as a guide surface of the inner surface 4b of the case 4 are within the joint center plane O. Consequently, the offset amount of the center O1 of the guide groove 1b is equal to the distance in the axial direction between the center O1 and the joint center plane O, and the offset amount of the center O2 of the guide groove 2b is equal to the distance in the axial direction between the center O2 and the joint center plane O. The offset amounts are equal.

When the outer joint member 1 and the inner joint member are angular displaced by the angle of $\theta$, the torque transmitting balls 3 guided by the cage 4 are always maintained within the equal half plane ($\theta/2$) of the angle $\theta$ at any operating angle $\theta$, so that the constant velocity of the joint is assured.

As mentioned above, the ratio r1 ($=PCD_{BALL}/D_{BALL}$) between the pitch circle diameter ($PCD_{BALL}$) and the diameter ($D_{BALL}$) of the torque transmitting ball 3 is set to a value within the range of $3.3 \leq r1 \leq 5.0$. The pitch circle diameter ($PCD_{BALL}$) of the torque transmitting ball is a dimension of twice as large as PCR ($PCD_{BALL}=2 \times PCR$). Each of the length of a line connecting the center O1 of the guide groove 1b in the outer joint member 1 and the center O3 of the torque transmitting ball 3 and the length of a line connecting the center O2 of the guide groove 2b in the inner guide member 2 and the center O3 of the torque transmitting ball 3 is PCR, and both of the lengths are equal to each other.

The ratio r2 ($=D_{OUTER}/PCD_{SERR}$) between the outer diameter ($D_{OUTER}$) of the outer joint member 1 and the pitch circle diameter ($PCD_{SERR}$) of the teeth (serration or spline) of the engagement portion 2c of the inner joint member 2 is set to a value within the range of $2.5 \leq r2 < 3.2$ for the above-mentioned reason.

Figure 3A:
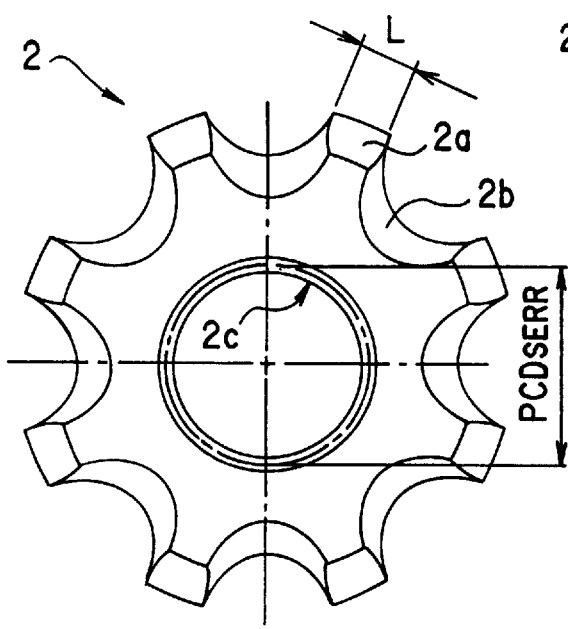
FIG. 3 Is a front view {FIG. 3(a)} and vertical cross sectional view {FIG. 3(b)} of an inner joint member.
Figure 3B:
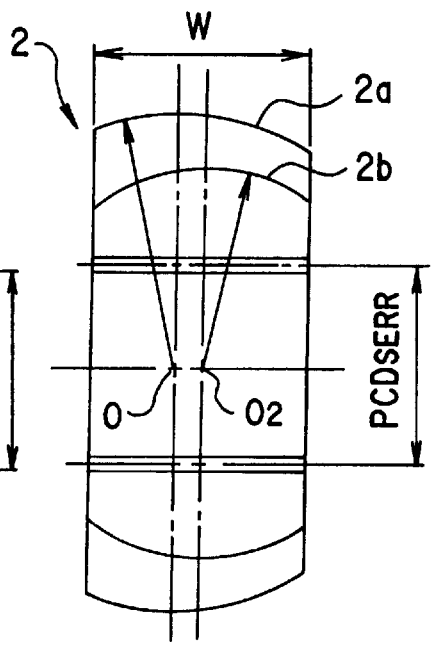
Figure 4A:
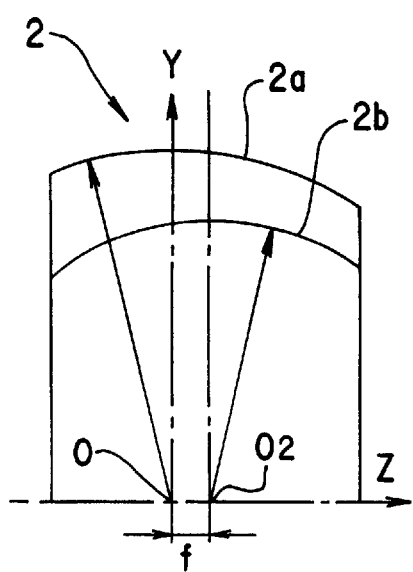
FIG. 4 Is a partial vertical cross-sectional view {FIG. 4(a)} and a partial diagrammatic front view {FIG. 4(b)} of the inner joint member.
Figure 4B:
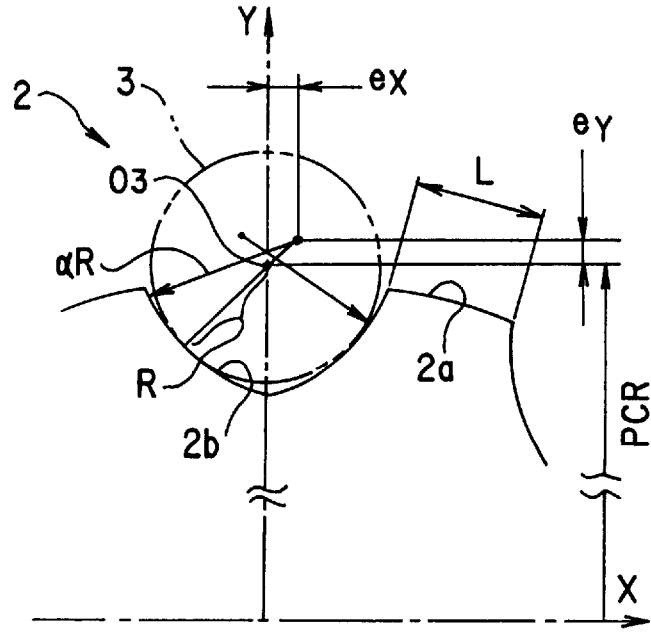
Figure 5:
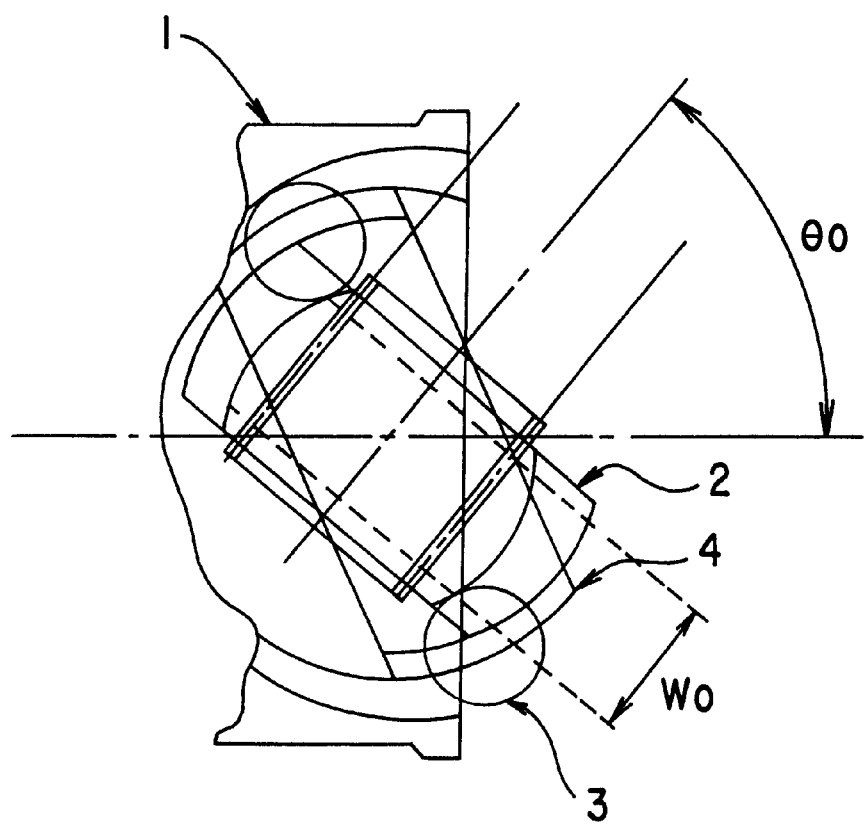
FIG. 5 Is a conceptual diagram showing the state at the time of assembly of a torque transmitting ball.

FIG. 3 shows the inner joint member 2. The inner joint member 2 is preformed from a steel material in an almost predetermined shape by hot working or sub-hot working, finished in a final shape by cold forging the outer surface 2a and the guide grooves 2b, and after that, subjected to a post process (griding process or the like) for assuring the accuracy.

The width (L) in the circumferential direction of the outer surface 2a of the inner joint member 2 is equal to or larger than 3.5 mm ($L \geq 3.5$ mm). The width (W) in the axial direction is set so that, when the assembly angle ($\theta_0$) of the torque transmitting ball 3 is 50°, the ratio Rw ($=W/PCD_{SERR}$) between the width (W) and the pitch circle diameter ($PCD_{SERR}$) of the teeth of the engagement portion 2c lies within the range from $0.57 < Rw \leq 0.95$, thereby enabling the inner joint member 2 to be cold forging to reduce the process cost while enabling the torque transmitting ball 3 to be assembled at the assembly angle $\theta_0$ of 50°. By reducing the width (W) in the axial direction as much as possible, the weight, dimension and material cost can be reduced. In the case of chamfering the border part (shoulder part) between the guide groove 2b and the outer surface 2a, the width (L) in the circumferential direction is set to a dimension including the chamfer.

According to the constant velocity universal joint in the embodiment, the number of the torque transmitting balls 3 is eight. Since the ratio of the load per torque transmitting ball to the whole load amount of the joint is lower as compared with the conventional joint (ball fixed constant velocity universal joint using six balls), the diameter ($D_{BALL}$) of the torque transmitting ball 3 is made smaller than that of the conventional joint of the same nominal size and the outer joint member 1 and the inner joint member 2 can be assured to be as thick as those of a conventional joint. The ratio r2 ($=D_{OUTER}/PCD_{SERR}$) is set to be lower than that of the conventional joint of the same nominal size (a general value of r2 of the conventional joint is $r2 \geq 3.2$). While assuring the strength, load carrying capacity, and durability equal to or more than those of the conventional joint, the outer diameter ($D_{OUTER}$) can be further reduced. For example, when the pitch circle diameter ($PCD_{SERR}$) of the engagement portion 2c is set to the same value as that of the conventional joint, the outer diameter ($D_{OUTER}$) can be reduced by three sizes in nominal number. It is confirmed from the result of experiments that the heat generation is smaller than that of the conventional joint.

Further, since the width (W) in the axial direction of the inner joint member 2 is set to a value within the range of $0.57 < Rw \leq 0.95$, the axial dimension is smaller, the weight is lighter, and the cost is lower as compared with the conventional joint.

What is claimed is:

1. A constant velocity universal joint for a propeller shaft having a shaft portion, comprising: an outer joint member in which eight guide grooves extending in an axial direction are formed on an inner spherical surface thereof; an inner joint member in which eight guide grooves extending in the axial direction are formed on an outer spherical surface thereof and an engagement portion having teeth which come into tooth-engagement with the shaft portion of the propeller shaft is formed on an inner surface thereof; eight torque transmitting balls disposed in eight ball tracks, respectively, each ball track formed by cooperation between one of the guide grooves in the outer joint member and a corresponding one of the guide grooves in the inner joint member; and a cage for holding each one of the torque transmitting balls, wherein the ball tracks widened toward one side in the axial direction forming wedge shape configurations, and a ratio Rw ($=W/PCD_{SERR}$) between an axial width (W) in the axial direction of the inner joint member and a pitch circle diameter ($PCD_{SERR}$) of the teeth of the engagement portion is $0.57<Rw\leq0.95$ and a circumferential width (L) in the circumferential direction of the outer surface between the guide grooves of the inner joint member is $L\leq3.5$ mm.

2. A constant velocity universal joint for a propeller shaft according to claim 1, wherein the inner joint member is formed by cold forging.

3. A constant velocity universal joint for a propeller shaft according to claim 1, wherein a ratio r1 ($=PCD_{BALL}/D_{BALL}$) between the pitch circle diameter ($PCD_{BALL}$) of the torque transmitting balls and the diameter ($D_{BALL}$) of each torque transmitting ball is $3.3\leq r1\leq5.0$ and a ratio r2 between the outer diameter ($D_{OUTER}$) of the outer joint member and the pitch circle diameter ($PCD_{SERR}$) of the teeth of the engagement portion is $2.5\leq r2\leq3.2$.

4. A constant velocity universal joint for a propeller shaft according to claim 1, wherein the outer joint member is coupled to a transmission or differential of a vehicle.

5. A propeller shaft in which the constant velocity universal joint according to any one of claims 1–4 is attached to the shaft portion thereof.

6. A propeller shaft comprising a shaft portion and a plurality of joints, wherein at least one of the joints is a constant velocity universal joint comprising: an outer joint member in which eight guide grooves extending in the axial direction are formed on an inner spherical surface thereof; an inner joint member in which eight guide grooves extending in the axial direction are formed on an outer spherical surface thereof and an engagement portion having teeth which come into tooth-engagement with the shaft portion; eight torque transmitting balls disposed in eight ball tracks, respectively, each ball track formed by cooperation between one of the guide grooves in the outer joint member and a corresponding one of the guide grooves in the inner joint member; and a cage for holding the torque transmitting balls, wherein the ball tracks widened toward one side in the axial direction forming wedge shaped configurations, wherein a ratio Rw ($=W/PCD_{SERR}$) between an axial width (W) in the axial direction of the inner joint member and a pitch circle diameter ($PCD_{SERR}$) of the teeth of the engagement portion is $0.57<Rw\leq0.95$ and a circumferential width (L) in the circumferential direction of the outer surface between the guide grooves of the inner joint member is $L\leq3.5$ mm.

* * * * *